United States Patent Office 3,106,067
Patented Oct. 8, 1963

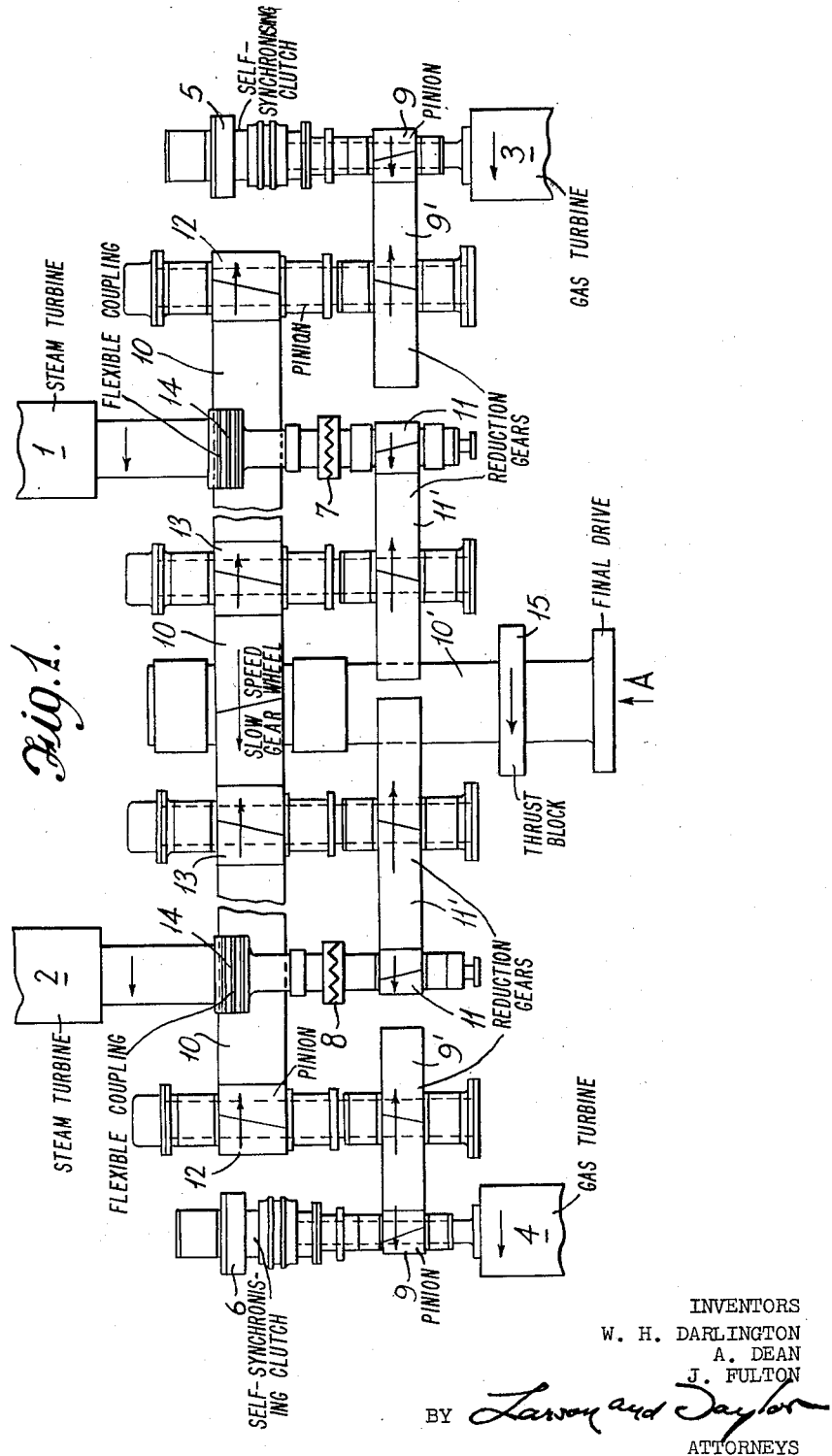

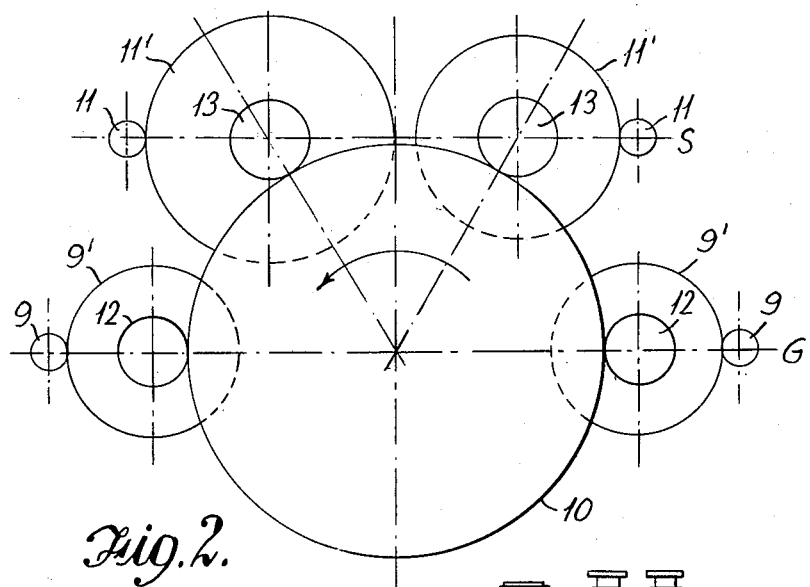
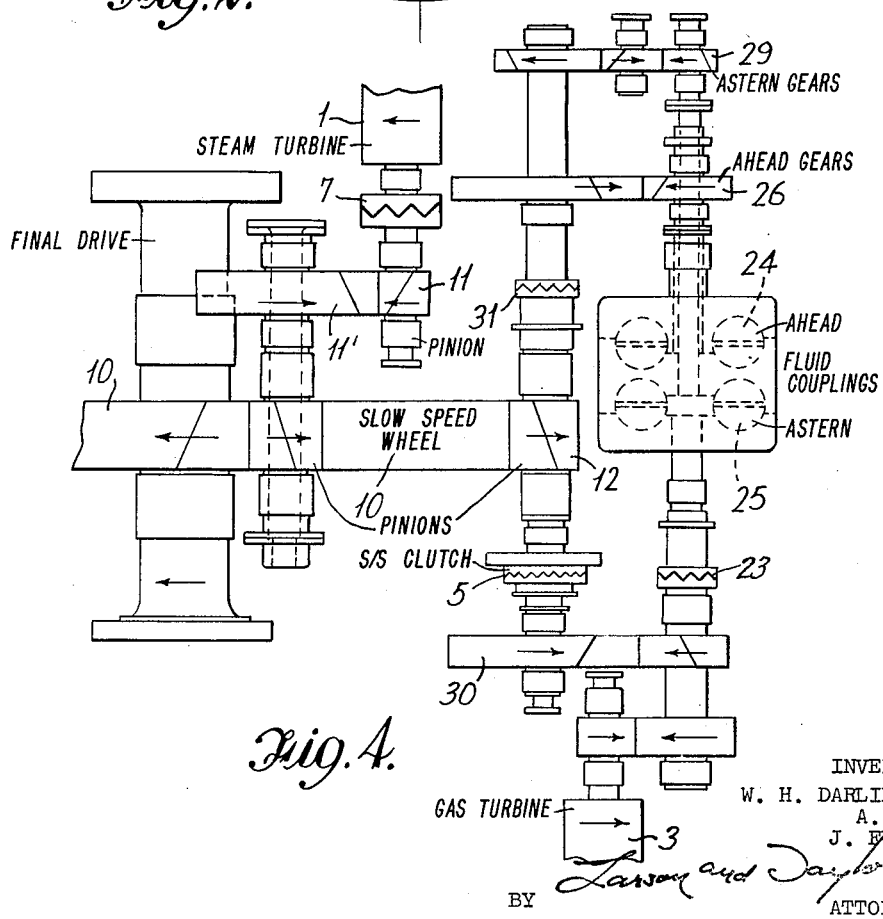

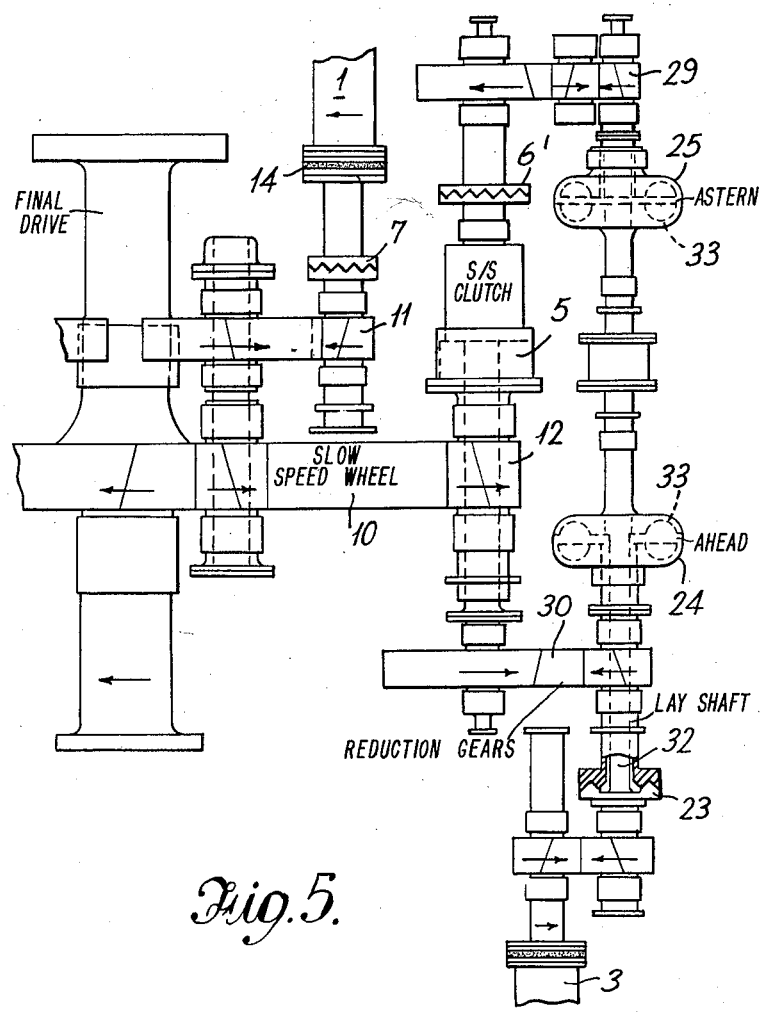

3,106,067
TURBINE POWER PLANTS
William Henry Darlington, Stretford, Arthur Dean, Urmston, and James Fulton, Stretford, England, assignors to Associated Electrical Industries (Manchester) Limited, London, England, a corporation of Great Britain
Filed June 11, 1958, Ser. No. 741,428
Claims priority, application Great Britain June 11, 1957
4 Claims. (Cl. 60—102)

This invention is concerned with turbine power plants in which one or more power units are connected through gearing to a common final drive. Such plants are of particular advantage in connection with ship propulsion.

In certain types of vessels it frequently happens that, for the greater part of its life, the machinery is delivering only a small part of its available full power. This is an inefficient arrangement and leads to an unnecessary amount of fuel consumption.

With a view to overcoming this disadvantage, this invention provides a turbine power plant which comprises main and auxiliary sets of power units connected through reduction gearing to the final drive, which in the case of ship propulsion equipment is a propeller shaft. One of the sets supplies power for normal operation at low power with a good efficiency, whilst the other set is employed as a boost unit and is brought into operation whenever high power is required. Conveniently, a gas turbine is used for the boost unit.

The invention is characterized by a clutch arranged for connecting or disconnecting each main turbine to or from a first pinion of one of the main reduction gear trains, and by self-synchronizing clutch means arranged for connecting each auxiliary reduction gear train, each self-synchronizing clutch means being normally disengaged and being automatically brought into engagement for transmitting power from its boost turbine to the slow speed wheel when this turbine is put into operation thereby to supply additional boosting power to the output shaft.

In a typical embodiment of the invention, as hereafter described, two gas turbines on axes displaced either side of the final drive axis are used for auxiliary boosting, and a high pressure and low pressure cross-compound steam turbine plant provides the main power, the axes of the steam turbine lying in the same horizontal plane and on either side of the vertical plane through the drive shaft axis. The invention will be clearly understood from a consideration of the following description of the accompanying diagrammatic drawings. In the drawings, FIG. 1 is a developed plan view, and FIG. 2 a gearing diagram as viewed in the direction A of the shafts of FIG. 1, looking forward. The arrows represent the direction of rotation of the various shaft axes.

FIG. 4 shows a modified arrangement of a portion of FIG. 1, and FIG. 5 shows an alternative modification of FIG. 4.

Figure 3:
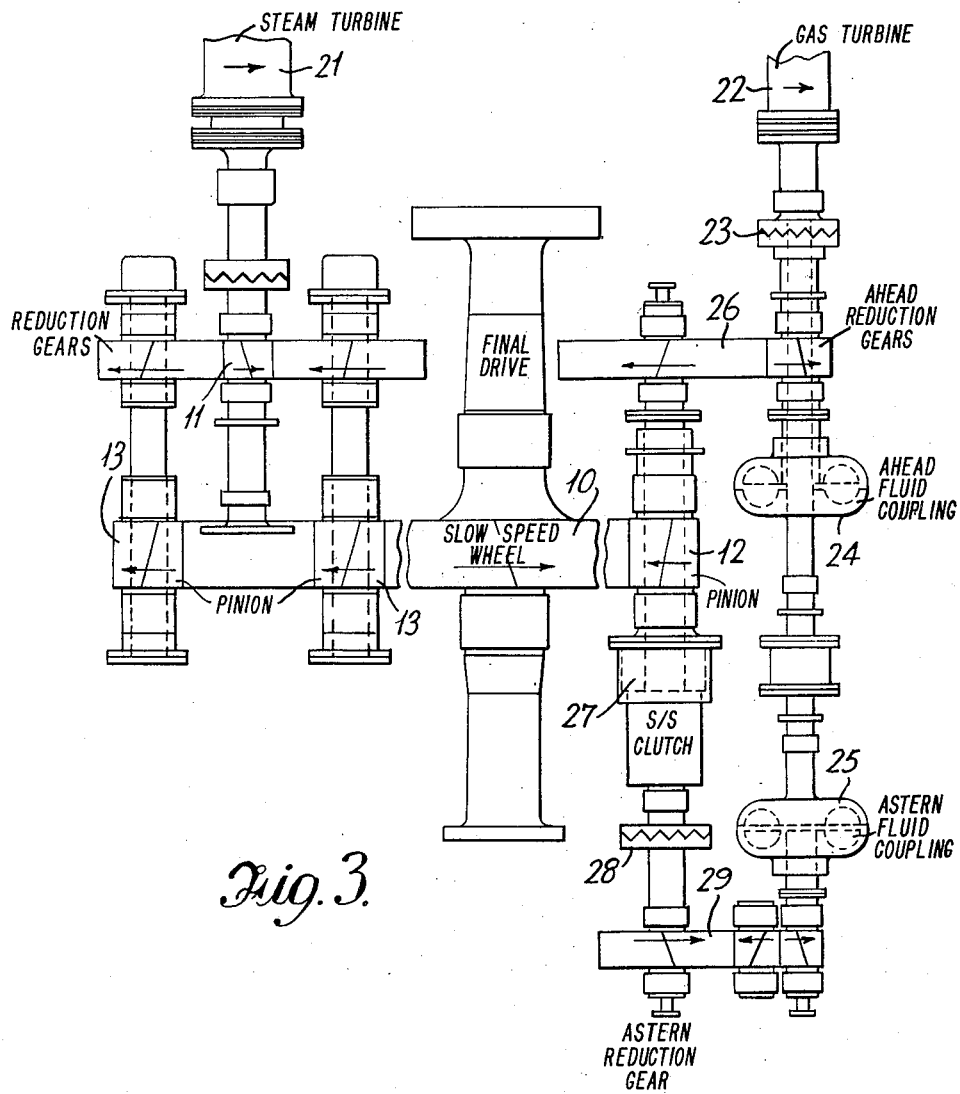
FIG. 3 is a similar arrangement to that of FIG. 1 employing a single main and a single auxiliary turbine.

FIGS. 1 and 2 represent two steam turbines 1, 2 (which may be the low pressure and the high pressure machines of a cross-compound turbine) and two gas turbines 3, 4 which are coupled through reduction gearing to a slow speed wheel 10 mounted on a final drive shaft 10' which may be a propeller shaft for ship propulsion. The steam turbines are connected through clutches 7, 8 of any suitable type, and first reduction gears 11, 11' to second pinions 13 in mesh with the wheel 10. The gas turbines are similarly connected through self-synchronising clutches 5, 6, first reduction gears 9, 9' and second pinions 12 also meshing with wheel 10. The steam turbine shafts include flexible couplings 14. The clutches and gearing are housed in a gear case (not shown) which also supports the main thrust block 15, e.g. of the "Michell Thrust" or other suitable construction; the thrust block may be integral with the gear case.

As seen in FIG. 2, the axes of the two first reduction gears 9 for the gas turbines and the axis of the slow speed wheel 10 are in the same horizontal plane G. The axes of the two first reduction gears 11 for the steam turbines lie in a horizontal plane S displaced vertically from the gas turbine plane G. The four second reduction pinions 12, 13 are approximately 60° apart where they engage the slow speed wheel 10. With this arrangement each power unit can be designed to run at its most suitable speed. An advantage is that free space is available for the clutches 5—8 which connect the power units to their first reduction pinions, without additional lengths being necessary. Further advantages are that the positions of the high speed lines give ample clearance between each pair of steam and gas units, and the higher plane of the steam turbines allows sufficient space for the condenser which is generally located beneath the turbine.

The synchronising clutches 5, 6 are operatively fitted between each gas turbine and its first reduction pinion 9 so that, for normal ahead and astern operation on only steam turbines, these synchronising clutches are disengaged. Specifically pinion 9 is mounted on a quill shaft fixed to the driven member of the clutch and the driving member of the clutch is mounted on a shaft (shown by broken lines) which passes through the quill shaft and is coupled to the turbine shaft. When additional ahead power is required, the synchronising clutch is automatically engaged on starting up the gas turbine. The self-synchronizing clutch means may be of any known construction; a suitable such mechanism is described in pending U.S.A. application Serial No. 731,925, now Patent No. 2,984,324 (Darlington et al.), filed April 30, 1958, and assigned to the same assignees as the present invention.

A clutch 7, 8 is fitted between each steam turbine and its first reduction pinion 11 so that emergency running can be obtained by gas turbine only, the gears 11, 13 running idle without rotating the steam turbine. These clutches are preferably of the involute toothed type.

In the particular arrangement of FIG. 1, the steam turbines are shown forward of the gear case and the gas turbines rearward, though this arrangement may be modified, and different numbers and types of power units can be used. For example, in the case of a tandem steam turbine and a single gas turbine, these units could be arranged side by side, forward or aft of the gear case.

The turbines are shown as connected to the gearing by means of the flexible couplings 14, but, where the arrangement is such that the turbines are a relatively great distance from the gear casing, torque tubes with flexible couplings at each end would be used instead.

FIG. 3 of the drawings shows a similar arrangement for a drive by a single main steam turbine 21 in combination with a single gas boost-turbine 22 driving the slow speed wheel 10; these turbines are arranged side by side forward of the gear case. The turbine 21 drives through a reduction pinion 11 and a pair of second pinions 13.

For boost purposes, clutch 23 is engaged, and clutch 28 disengaged; the gas turbine 22 then drives the slow speed wheel 10 through gears 26, a self-synchronising clutch 27, and the second pinion 12. For manoeuvring on the gas turbine alone, clutch 23 is disengaged, clutch 28 is engaged and self-synchronising clutch 27 is locked in engagement. The gas turbine 22 then drives through a pair of fluid couplings viz, the ahead coupling 24 which is coupled to the ahead gears 26, and the astern coupling 25 which is coupled to the astern gears 29. By filling the appropriate fluid coupling ahead or astern rotation of the propeller may be chosen as desired. Clutch 27 is connected in a manner similar to that previously described concerning clutch 5 of FIG. 1.

FIG. 4 illustrates a plant which is arranged generally in a similar way to FIG. 1 but incorporating fluid couplings as previously described to permit of manoeuvring by the gas turbines; corresponding parts are given the same numbers as before. As the plant is symmetrical about the slow speed wheel, only the right hand half is shown in the figure. The end view of the gearing is similar to FIG. 2, the axes of the gas turbines and the slow speed wheel lying in one horizontal plane with the steam turbine and their gearing lying in planes above the gas turbines.

A self-synchronising clutch 5 is fitted between each gas turbine first reduction ahead wheel 30 and the second reduction pinion 12 engaging slow speed wheel 10. For normal ahead and astern operation on only steam turbines, the synchronising clutch 5 and clutch 31 are disengaged. Under this mode of operation, only the second reduction gas turbine pinion 12 is idling. When additional ahead power is required, the synchronising clutch 5 is automatically engaged on starting up the gas turbine. A clutch 7 is fitted between the steam turbine 1 and its first reduction pinion 11 so that the turbine drive can be uncoupled and emergency running can be by gas turbine only, without rotating the steam turbine.

In order to manoeuvre on gas turbines only, ahead 24 and astern 25 fluid couplings are fitted together with their ahead 26 and astern 29 gear trains. By disengaging and holding out the synchronising clutch 5 and engaging clutches 23 and 31 the fluid couplings are coupled, and ahead and astern manoeuvring is obtained by filling or emptying the appropriate fluid coupling. Fluid coupling 24 connected to gear train 26 is filled when going ahead, and fluid coupling 25 connected to gear train 29 is filled when going astern.

FIG. 5 illustrates an alternative arrangement to FIG. 4. The ahead gear train 26 has been eliminated, the clutch 23 being located in advance of the reduction train 30 which is also used for ahead manoeuvring, thus reducing the number of gears.

For normal ahead and astern operation on only steam turbines, the synchronising clutch is disengaged and only the gas turbine second reduction pinion 12 is idling. When additional ahead power is required, clutch 23 is engaged, and the synchronising clutch is automatically engaged on starting up the gas turbine. A clutch 7 is fitted between the steam turbine 1 and its first reduction pinion 11 so that emergency running can be by gas turbine only, without rotating the steam turbine.

In order to manoeuvre on gas turbines only, ahead and astern fluid couplings 24, 25 are fitted, together with an astern train 29, the ahead train, as mentioned above, being the gas turbine first reduction gears 30. By engaging the synchronising clutch 5, disengaging the clutch 23 and engaging clutch 6' ahead or astern manoeuvring is obtained by filling or emptying the appropriate fluid coupling. Fluid coupling 24 connected to gear train 30 is filled when going ahead, and fluid coupling 25 connected to gear train 29 is filled when going astern. The synchronising clutch can be locked in engagement during operation.

It should be noted that whenever the gas turbine is in use, lay shaft 32 and the impeller members 33 of the fluid couplings are rotating. During boost operations, clutch 23 is engaged so that the drive to the first reduction gear 30 is direct and, is therefore, independent of losses in the fluid coupling. If the clutch 23 is replaced by a double clutch, then the whole of the manoeuvring system can be at rest during boosting.

What we claim is:

1. A turbine power plant comprising in combination main steam and auxiliary gas turbine units each connected through reduction gearing to a common slow speed gear wheel mounted in rigid driving connection with an output drive shaft, a clutch arranged for connecting or disconnecting each main turbine to or from a first pinion of one of the main reduction gear trains, and self-synchronising clutch means arranged for connecting each auxiliary gas turbine to a first pinion of one of the auxiliary reduction gear trains, said last-mentioned clutch means being normally disengaged and being automatically brought into engagement for transmitting power from its gas turbine to said slow speed wheel when said gas turbine is put into operation thereby to supply additional boosting power to said output shaft.

2. A turbine power plant as claimed in claim 1, comprising two steam turbines and two gas turbines, wherein said gas turbines are mounted on axes which are displaced on either side of and in the same horizontal plane as the axis of said slow speed wheel, and the axes of said steam turbines lie in a plane displaced vertically above said horizontal plane and on either side of the vertical plane through the axis of said drive shaft.

3. A turbine power plant as claimed in claim 1, comprising an additional driving connection incorporating a pair of fluid couplings provided between said gas boost turbines and said auxiliary reduction gears, clutch means for uncoupling said boost turbines from direct driving connection with said gears, and further clutch means for establishing a driving connection through said fluid couplings to said gears, whereby said gas turbines may be rendered effective for operation alone without rotating said steam turbines by appropriate control of said fluid couplings according to the desired direction of rotation of said drive shaft.

4. A turbine power plant comprising in combination a pair of main steam turbines, a pair of boost gas turbines, an output drive shaft, a slow speed wheel rigidly coupled to said shaft, a pair of main reduction gear trains connected respectively for transmitting drive from said steam turbines to said slow speed wheel, clutch means for disconnecting said steam turbines from said gear trains, a pair of fluid couplings for each of said gas turbines including driven and driving members, said driven members being mounted on a common lay shaft, means for connecting said lay shaft to a said gas turbine to be driven thereby, one of said driving clutch members being connected through a forward gear train and self-synchronising clutch means to said slow speed wheel, the other of said driving clutch members being connected through a reverse gear train and an auxiliary clutch to said self-synchronising clutch means, and a second auxiliary clutch having cooperative members connected to said lay shaft and said forward gear train respectively for connecting said boost turbine to transmit power through said forward train and said self-synchronising clutch means to effect a boosting operation on said output shaft.

References Cited in the file of this patent

UNITED STATES PATENTS

| 2,567,581 | Salter | Sept. 11, 1951 |
| 2,604,755 | Nordstrom et al. | July 29, 1952 |
| 2,663,144 | Nordstrom et al. | Dec. 22, 1953 |
| 2,663,145 | Waeselynck | Dec. 22, 1953 |
| 2,683,964 | Anxionnaz et al. | July 20, 1954 |

FOREIGN PATENTS

| 680,761 | Great Britain | Oct. 8, 1952 |